Patented June 30, 1942

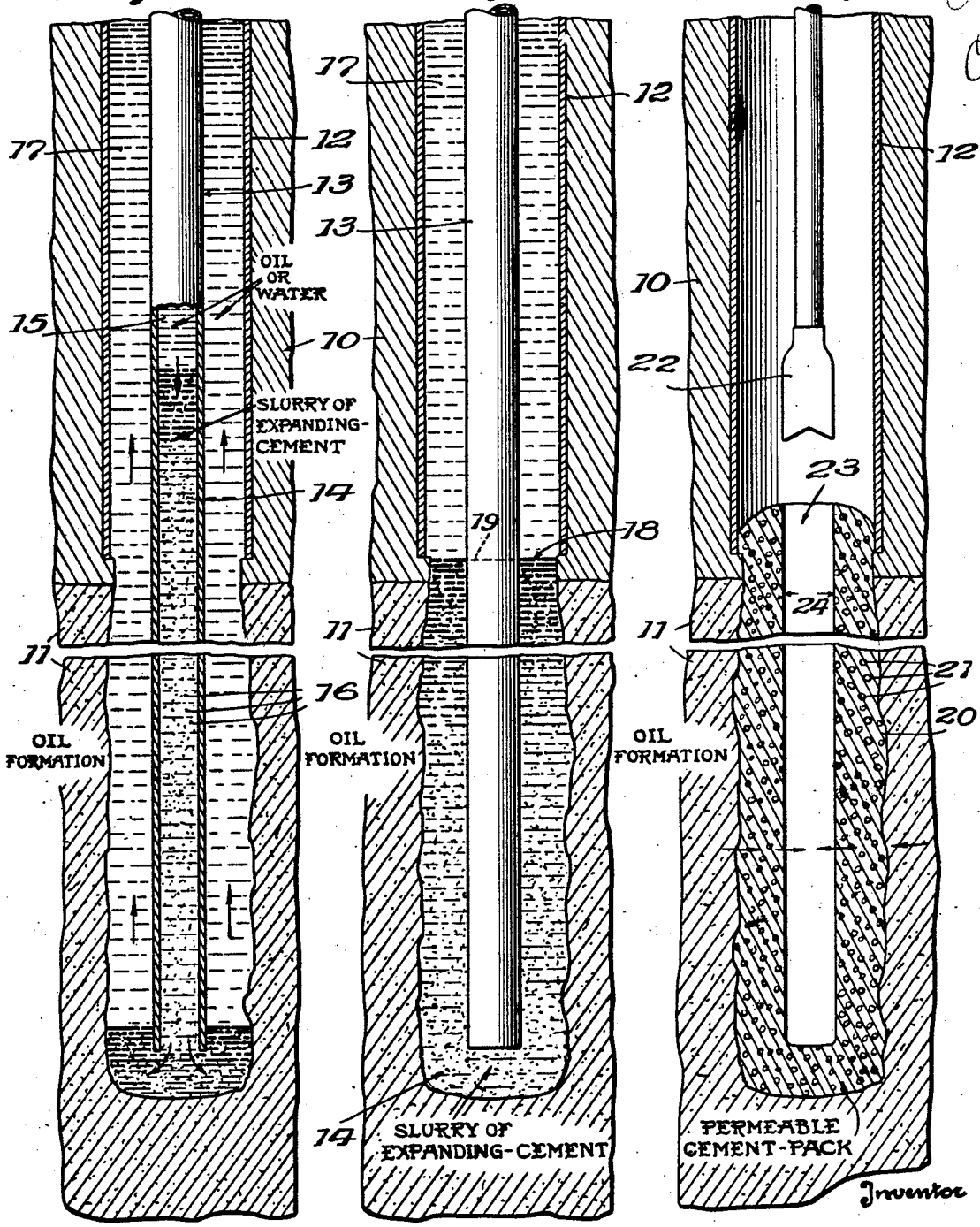

2,288,556

UNITED STATES PATENT OFFICE 2,288,556

METHOD OF AND COMPOSITION FOR PRO-
DUCING PERMEABLE PACKS IN WELLS

Leslie W. Vollmer, Pittsburgh, Pa., assignor to
Gulf Research & Development Company, Pittsburgh, Pa., a corporation of Delaware Application June 28, 1939, Serial No. 281,716

15 Claims. (Cl. 166—26)

This invention or discovery relates to Methods of and Compositions for Producing Permeable Packs in Wells; and it comprises a method of installing permeable filter packs in wells particularly those which extend through structurally weak or caving producing strata, including the steps of depositing adjacent the producing stratum face a mass of a fluent cement containing gas-producing material adapted to generate gas within the cement with development of considerable porosity and permeability therein and causing said cement to set in a porous and permeable condition; and it further includes a composition of matter for such purpose including cement and a quantity of gas generating material therein comprising finely divided matter of shape elongated in at least one dimension and of such character as to generate a relatively insoluble gas and in amount sufficient to bring about development of interconnected voids in the cement when gaged with water and caused to set under pressure; all as more fully hereinafter set forth and as claimed.

In completing oil wells a screen or strainer is usually set in the well adjacent the producing zone of the earth, and the well fluid is produced through the strainer. In practice, fine particles of mud and sand migrate to the strainer face and sometimes plug it in the course of time. The effective filter face of the strainer if not closed off is seriously reduced. Frequently the strainer must be pulled and replaced requiring that the well be shut down. Where the producing stratum is a fine unconsolidated sand, plugging of the strainer face occurs so frequently as to make the cost of continually pulling the strainer prohibitive. Some wells of a potentially high production rate have heretofore presented an insurmountable problem to the production engineer in that attempts to produce the pay zone result in almost instantaneous plugging or sanding up of the well equipment due to the unconsolidated nature of the producing formation. These difficulties are especially acute where high pressures obtain in the producing zone. In sandy wells, operators frequently refrain from shooting to increase production, an operation otherwise desirable, solely because of the difficulty subsequently presented in overcoming plugging of the strainers by the disintegrated sand.

It has been proposed to alleviate the plugging of strainers by providing a coarse sand or gravel pack around the strainer face, the purpose being to fill the voids between the strainer or tubing and the formation, to support the formation and to provide a permeable pack adapted to increase the filtering area, thus to diminish migration of small particles toward the strainer face.

Sand and gravel packs have proved beneficial, but they leave much to be desired in the way of efficiency and reliability. While the sand or gravel employed is too coarse to clog the strainer face, such material is nevertheless unconsolidated and hence a strainer must be used. The pack tends to channel during flow and when this occurs much fine sand from the formations will pass to the strainer face. Loose sand or gravel has no rigidity as a mass and is thus not very effective in preventing caving of the surrounding formation. Further, sand or gravel packs are difficult to place, and frequent trouble is encountered from bridging or obstruction to the well system when introducing sand or gravel down the well.

Among the objects achieved in the invention are the provision of a monolithic permeable pack or filter in a well adjacent a producing region; provision of a method of producing a rigid, permeable pack of high structural strength for supporting the exposed face of a caving producing formation; the provision of a porous and permeable cement pack surrounding a well strainer and adapted to prevent migration of sand toward the strainer; the provision of a method of increasing the effective area of filtering means in the producing zone of a well and the provision of a method of producing a permeable cement pack for an oil well producing region such that the conventional strainer can be eliminated.

According to the present invention, there is provided a method of packing the producing zone in a well which has the advantage that the pack is fluent while being introduced into the producing area, but thereafter sets into a rigid, monolithic mass of high permeability but of sufficient strength to prevent caving of the surrounding formations and to prevent channeling during flow of fluid therethrough.

In carrying out the method of the invention, a fluid slurry of a hydraulic cement is established having uniformly dispersed therein a substance or substances adapted to slowly generate gas during the interval preceding the initial set of the cement. For example, finely ground metallic aluminum is thoroughly mixed with dry Portland cement in a mill, and thereafter a slurry or grout is made by the addition of water. In the presence of water, the aluminum in the mixture is slowly attacked by the alkali (lime)

in the cement, hydrogen gas being liberated as one of the products of the reaction according to the equation:

$$2Al + Ca(OH)_2 + 2H_2O \rightarrow 3H_2 + CaAl_2O_4$$

or $$2Al + CaO + 3H_2O \rightarrow 3H_2 + CaAl_2O_4$$

This generation of gas produces voids in the slurry which persist after the cement is set and render the set mass quite permeable to gas and oil. Usually, it is desirable to add a stoichiometric proportion of free slaked lime or other suitable alkali to the mixture to react with the aluminum, as otherwise the cement when set may be deficient in lime. Advantageously, a finely divided aluminum wool may be used in place of part or all of the aluminum powder with the result that somewhat better overall permeability is achieved owing to the character of the pores left in the set cement. Instead of small round pores corresponding to the powder particles, an interlacing network of tiny channels corresponding to the aluminum wool filaments is produced.

After the fluid slurry of cement is established containing the gas-generating substance or substances, it is introduced down the well and localized in a body at the zone where it is desired to produce through the permeable pack. For instance, in completing a new well in a sandy formation, after the casing is set above the producing stratum and the producing stratum has been drilled into, the uncased bottom portion is washed by circulating water or oil through the drill pipe, and an amount of slurry calculated to fill (when expanded) the uncased portion of the bore, is then introduced down the drill pipe and into the bore where it displaces the fluid there present. The drill pipe is withdrawn before the cement sets, and thereafter the set plug or pack of porous and permeable cement is drilled into and the well produced through the pack. This drilling operation is not strictly necessary in order to produce the well, but it effectively increases the filter area over that afforded when the well is produced only through the top of the pack. In a well which is already completed the cement slurry may be introduced in a known manner by the use of a bailer or the like. If desired, a strainer may be set between the porous cement pack and the liner, but owing to the excellent filtering properties of the pack, this is usually not necessary as the oil can be pumped or flowed without sand entering the tubing or pump. The method thus obviates the necessity of using a strainer in the well.

In the accompanying drawing there is illustrated in a diagrammatic or schematic manner a typical mode of carrying out the invention. In the drawing, Fig. 1 is a diagrammatic view of an oil well in central vertical section, showing the beginning of the expanding-cement placing operation.

Fig. 2 is a similar view with the expanding-cement in position, and

Fig. 3 is a similar view, after setting of the cement as a pack and after drilling out the pack.

Referring to the drawing, there is shown a well extending from overlying consolidated formations 10 into an unconsolidated oil sand 11. The upper part of the well is cased as shown at 12. A drill pipe or tubing 13 is lowered to near the bottom of the well, as shown, and a charge of a fluent expanding-cement slurry, indicated at 14, is introduced under a load of water or oil 15. The slurry contains particles 16 of aluminum or other gas generating material as described. The annular space between the tubing and the well is initially filled with oil or water 17, which is displaced upwardly by the cement slurry. The cement flows into the well bottom as shown.

The cement slurry is forced down until the level 18 thereof outside the tubing coincides with the level 19 inside the tubing (Fig. 2). This is accomplished in a known way, by measuring the quantity of oil or water 17 displaced from the top of the casing. At the stage of operations indicated in Fig. 2, the tubing is raised above the cement charge, leaving the well bottom filled therewith. Excess cement slurry can then be flushed out if desired by a circulation of oil or water between the tubing and the well. The cement is now given time to set.

Fig. 3 shows the set cement 20, forming a liner or pack with pores 21 for flow of oil into the well. The pack is drilled out by a drill 22 which is smaller than the well diameter, to leave a chamber 23 in the pack having an extensive exposed face 24 for influx of oil.

The charge of cement slurry is advantageously sufficient in amount to fill (when set) the producing part of the well and extend up to the bottom of the casing, as shown in Fig. 3.

The size of and communication between pore spaces in the set cement determines the permeability of the set cement and its effectiveness as a filter. The configuration and size of the pore spaces is largely determined by the physical shape and size of the gas-generating substance and the manner in which it is dispersed through the slurry. The volume of pore space is determined by the amount of gas-generating substance added. Because of the compressibility of gases, some variation in the amount of gas-generating substance added to the slurry is necessitated by differences in pressure existing in different wells at the zone where the pack is to be produced. As the well must be closed in to prevent flow from the formation during the setting of the cement, the pressure to which the slurry is subjected during setting is as high as or higher than the formation pressure or bottom hole pressure of the well. This pressure ordinarily is 1000 pounds per square inch or higher.

I have found that a pack of excellent strength and permeability may be produced under 1000 pounds per square inch pressure by making up a slurry of the following composition and introducing it into a well in the manner indicated:

| | Pounds |
|---|---|
| Portland cement | 100 |
| Aluminum powder (120-mesh size) | 4 |
| Slaked lime, Ca(OH)₂ | 5.5 |
| Water | 70 |
| Sodium chromate | 0.8 |

The cement, set under 1000 pounds pressure, has a permeability of 70 millidarcies. By way of comparison, a cement of the same composition but with the aluminum, sodium chromate and lime omitted, setting under the same conditions, yields a set cement of only 4 millidarcies permeability.

Substituting the same weight of aluminum wool for the aluminum powder in the above mix yields a set cement of somewhat higher permeability.

In general, the most suitable proportions of aluminum, lime, sodium chromate and water, per 100 pounds of Portland cement, lie in the ranges 50 to 70 pounds water, 3 to 20 pounds aluminum, zero to 28 pounds Ca(OH)$_2$ and 0.5 to 4.0 pounds sodium chromate.

The gas-generating reaction is controlled so that it does not start before the cement slurry has been located in the well, but is complete before the cement takes an initial set. If the reaction begins too quickly, considerable gas is lost from the flowing slurry, and if the cement sets during the peak of the reaction, the strength of the pack is greatly reduced. The start of the reaction is delayed by the addition of sodium chromate to the water used in the slurry. Apparently, sodium chromate immediately produces a thin oxide coating on the aluminum particles, which thereafter is slowly penetrated by the alkali. The rate of reaction after starting is controlled by regulating water temperatures and varying the aluminum particle size.

The reaction between metallic aluminum and alkali is exothermic, and when relatively large amounts of aluminum are used, as in a pack adapted to be located in a high-pressure zone, it is desirable to use special oil well cements that set slower at elevated temperatures than does regular Portland cement. These special retarded cements are well known in the oil well cementing art and are readily available in a variety of setting characteristics. Additional strength can be imparted by admixing an aggregate such as sand or gravel but in order to maintain good permeability the aggregate should best be of uniform size. Well graded coarse sand is suitable.

Certain other finely divided metals may be employed in a way analogous to aluminum, for example metallic calcium. There is no need to add lime to the cement when calcium is employed. A sodium amalgam, Na—Mg—Hg gives good results. These materials decompose water directly with production of hydrogen gas. Aluminum, however, is ordinarily the cheapest and most convenient metal to use.

The nature of the gas generated in the cement is important, particularly because of the high pressure conditions under which the cement sets. I find that cements in which the gas generated is hydrogen, are distinctly superior to some others, because hydrogen is relatively insoluble in water and because it suffers a relatively less decrease in volume with increase in pressure than many other gases. However, other gas forming materials can be employed, such as calcium carbide and barium carbide which react with water to yield acetylene. In employing these carbides it is best to use powdered material the grains of which are coated with wax, stearic acid or other coating adapted to slow down the reaction with water.

In depositing the cement slurry in place, any of the conventional well-cementing methods and apparatus is used.

Ammonium nitrite can likewise be employed in the cement as a gas generating agent. Ammonium nitrite in aqueous solution undergoes autodecomposition at moderate temperatures, into water and free nitrogen. The rate of decomposition can be retarded by incorporation into the mix of ammonia or certain organic amines.

The portion of the well bore in which the permeable cement pack is shown as of the same size as the upper part of the bore, but if desired the producing region can be enlarged, as by under-reaming, prior to placing the permeable cement pack. This exposes a larger effective producing area.

What I claim is:

1. A method of producing a permeable pack in a well which comprises depositing adjacent a producing zone of a well and maintaining thereat, under a pressure of the same order as the well formation pressure, until set, a body of a fluent slurry of cement, containing a quantity of gas-generating material comprising finely divided matter, adapted to generate gradually a gas of relatively low solubility in water and in amount great enough so that as the slurry sets, under a maintained pressure sufficient substantially to prevent expansion of the body of cement slurry as a whole, interconnecting voids are formed in the body with development of a substantial degree of permeability to fluids.

2. In methods of producing permeable packs in wells the improvement which comprises depositing adjacent a producing zone of a well and maintaining thereat under pressure until set, a body of a fluent slurry of cement, containing a quantity of gas-generating material comprising finely divided matter of shape elongated in at least one dimension to a length much longer than the dimensions of the cement particles and adapted to generate gradually a gas of relatively low solubility in water and in amount such as to yield a quantity of gas at least equal to that yielded by 3 pounds aluminum with a stoichiometrically equivalent amount of alkali per 100 pounds cement, dry basis; so that as the slurry sets, under said maintained pressure, interconnecting voids are formed in the body with development of a substantial degree of permeability to fluids.

3. In methods of producing permeable packs in wells the improvement which comprises depositing adjacent a producing zone of a well and maintained thereat under pressure until set, a body of a fluent slurry of cement, containing a quantity of gas-generating material comprising finely divided solid matter of shape elongated in at least one dimension, said solid matter being materially greater in said dimension that the size of cement particles adapted to generate gradually a gas of relatively low solubility in water and in amount sufficient so that as the body of slurry sets and hardens, under said maintained pressure, interconnecting voids are formed in the body with development of a substantial degree of permeability to fluids.

4. The method of claim 3 wherein a cavity is bored into the body after setting, for flow of fluids from the rock through the body into the cavity.

5. In methods of producing permeable packs in wells the improvement which comprises depositing adjacent the producing zone of a well and maintaining thereat under pressure until set, a body of a fluent slurry of cement, containing a quantity of finely divided matter elongated in at least one dimension to a length much greater than the dimensions of the cement particles, and also containing distributed therethrough an agent adapted gradually to attack and break down said matter, leaving elongate voids whereby on hardening of the cement a permeable pack with interconnecting voids is produced.

6. A composition of matter for use in providing permeable packs in wells, comprising cement and a quality of gas-generating material distributed therethrough, said material comprising finely divided matter of shape relatively elongated in at least one dimension to a length much greater than the dimensions of the cement particles and of character such as to generate a gas of relatively low solubility in water, and in amount great enough so that when a body of the cement is gaged with water and caused to set under a superatmospheric pressure, such as to prevent any substantial expansion, interconnected voids are formed in the body with development of a substantial degree of permeability to fluids.

7. The composition of claim 6 wherein the gas-generating material is one adapted to generate hydrogen gas.

8. The composition of claim 6 wherein the gas-generating material comprises finely divided aluminum and lime and a substance for retarding the reaction between the aluminum and lime.

9. The composition of claim 6 wherein the gas-generating material comprises a metal adapted to form hydrogen gas on contact with water.

10. The composition of claim 6 wherein the gas-generating material is a carbide capable of generating acetylene gas on contact with water.

11. The composition of claim 6 wherein the cement comprises Portland cement.

12. The composition of claim 6 wherein the fluent cement comprises Portland cement, water, finely divided aluminum and lime and a substance for retarding the reaction between the aluminum and lime.

13. The composition of claim 6 wherein the gas generating material comprises aluminum in amount 3 to 20 per cent by weight of the cement, dry basis, enough reactive alkali for complete reaction with the aluminum, and a substance adapted to retard reaction of the aluminum and alkali.

14. The composition of claim 6 wherein sufficient gas generating material is incorporated to impart a permeability of at least 70 millidarcies to the set slurry maintained under a pressure of 1000 pounds per square inch during gas generation and setting.

15. The method of claim 6 wherein the gas generating material comprises aluminum in finely divided particles, thin but relatively long in at least one dimension, whereby a multitude of intercommunicating gas pores are formed in the cement.

LESLIE W. VOLLMER.

CERTIFICATE OF CORRECTION.

Patent No. 2,288,556.                                                                                June 30, 1942.

LESLIE W. VOLLMER.

It is hereby certified that error appears in the printed specification of the above numbered patent requiring correction as follows: Page 3, second column, line 75, claim 6, after "relatively" insert --greatly--; page 4, second column, line 19, claim 15, for "method" read --composition--; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.

CERTIFICATE OF CORRECTION.

Patent No. 2,288,556. June 30, 1942.

LESLIE W. VOLLMER.

It is hereby certified that error appears in the printed specification of the above numbered patent requiring correction as follows: Page 3, second column, line 75, claim 6, after "relatively" insert --greatly--; page 4, second column, line 19, claim 15, for "method" read --composition--; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.